United States Patent [19]

Marutake et al.

[11] Patent Number: 5,010,575

[45] Date of Patent: Apr. 23, 1991

[54] AUDIO CURRENT PICK-UP DEVICE

[75] Inventors: Yozo Marutake; Tatsuro Fukutome; Motomu Asami, all of Tokyo, Japan

[73] Assignee: Rion Kabushiki Kaisha, Tokyo, Japan

[21] Appl. No.: 353,839

[22] Filed: May 17, 1989

[30] Foreign Application Priority Data

May 30, 1988 [JP] Japan .................. 63-134085

[51] Int. Cl.$^5$ ............... H04R 25/00; H04M 1/100
[52] U.S. Cl. .............................. 381/68; 381/74; 379/443; 84/725
[58] Field of Search .............. 381/68; 379/443; 84/725, 726, 727, 728; 324/117 R, 127

[56] References Cited

U.S. PATENT DOCUMENTS

| 2,048,604 | 7/1936 | Finch | 379/443 |
| 3,472,943 | 10/1969 | Kawabata et al. | 84/726 |
| 3,649,737 | 3/1972 | Jespersen | 84/725 |
| 3,808,560 | 4/1974 | Gassmann | 84/725 |
| 4,096,780 | 6/1978 | Dawson | 84/726 |
| 4,348,930 | 9/1982 | Chobanian et al. | 84/726 |

Primary Examiner—Jin F. Ng
Assistant Examiner—Jason Chan
Attorney, Agent, or Firm—Sughrue, Mion, Zinn, Macpeak and Seas

[57] ABSTRACT

An audio current pick-up device for use with an electric wire 6 carrying an electric current containing audio information comprises a pair of substantially identical magnetic induction coil assemblies 26, 27 disposed in parallel to each other with an axial deviation and orthogonally to the wire, each coil means including a magnetic core in the form of rod 30, 38 and a pair of induction coils 32A, 32B, 39A, 39B wound in opposite directions on respective halves of its core rod. An output of either of the induction coils is phase-shifted by a preset amount and composited with an output of the other magnetic induction coil to form a sound pick-up signal from which a sound output signal is derived.

3 Claims, 6 Drawing Sheets

AUDIO CURRENT PICK-UP DEVICE

BACKGROUND OF THE INVENTION

The present invention relates to an audio current pick-up device and, particularly, to such a device for picking-up audio information from an electric current flowing through an electric wire.

In order to pick-up audio information from a minute electric current flowing through an electric wire such as a telephone cord, it is usual to use a receiver including an amplifier having a high amplification factor. Since, in such a scheme, there is a tendency to generate howling in the receiver, it is difficult to increase the sound output to a level high enough to be heard. This is particularly true when the receiver is a hearing-aid.

As to a conventional receiver for picking-up an audio information from a minute electric current flowing an electric wire, FIG. 7 shows a hearing-aid 2 in intimate contact with a telephone receiver 1. The hearing-aid 2 includes an induction coil therein which picks up magnetic flux leakage from the receiver 1 and provides an electric signal corresponding to a variation thereof. The signal is amplified by an amplifier of the hearing-aid 2 having an amplification function and a frequency characteristics correction function to a level suitable for the user so that he can hear it through an earphone (not shown) connected to a cord 3.

A further conventional scheme is shown in FIG. 8 in which a telephone coil 4 is mounted on a receiver 1. Magnetic flux leakage from the receiver is picked up by the coil 4 an electric output signal of which is supplied through a wire 5 to a user's hearing-aid 2.

In the scheme shown in FIG. 7 or 8, it is impossible to pick up a sound current of practically sufficient S/N ratio when the magnetic flux leakage from the telephone receiver 1 is small.

SUMMARY OF THE INVENTION

An object of the present invention is to provide a receiver for use with an electric wire carrying information in the form of electric current, which is capable of providing an audio output at a level with a practically acceptable S/N ratio, which is high enough to make it possible to obtain the information clearly even if the magnetic flux leakage from the wire is very small.

The above object can be achieved, according to the present invention, by providing a receiver which comprises a pair of substantially identical magnetic induction coil means disposed in parallel to each other with a certain axial deviation and orthogonal to an electric wire such as a telephone cord carrying sound current. Each coil means includes a magnetic core in the form of a rod and at least one coil wound thereon.

According to a first aspect of the present invention, the coils wound on the parallel magnetic induction coil means are deviated axially by a predetermined distance L/2, where L is about a half length of the rod core. A sound output signal is derived as a combination of output signals of these coils.

According to a second aspect of the present invention, each magnetic induction coil means includes a pair of induction coils wound in opposite directions on respective halves of its core rod. The induction coils are connected in parallel to each other.

According to a third aspect of the present invention, an output of the induction coil of one of the magnetic induction coil means is phase-shifted by a preset amount and composited with an output of the other magnetic induction coil means to form a sound pick-up signal from which a sound output signal is derived.

With the arrangement of the magnetic induction coil means with the axial positional deviation, a magnetic flux leakage from the telephone cord disposed in between these induction coil means and orthogonally thereto can be picked up by the induction coils thereon efficiently. Further, with the oppositely wound, parallel connected induction coils on each induction coil means, it is possible to reduce the effect of external noise on the output sound signal.

Further, the composition of an output signal of the induction coil of one of the magnetic induction coil means and that of the other induction coil means shifted in phase by the predetermined amount assures that it is possible to obtain a sufficient sound output signal regardless of a twisting angle of the telephone cord with respect to the induction coil means.

BRIEF DESCRIPTION OF THE DRAWINGS

FIG. 6 illustrates another embodiment of the induction coil portion of the present invention;

DETAILED DESCRIPTION OF THE PREFERRED EMBODIMENTS

Figure 1:
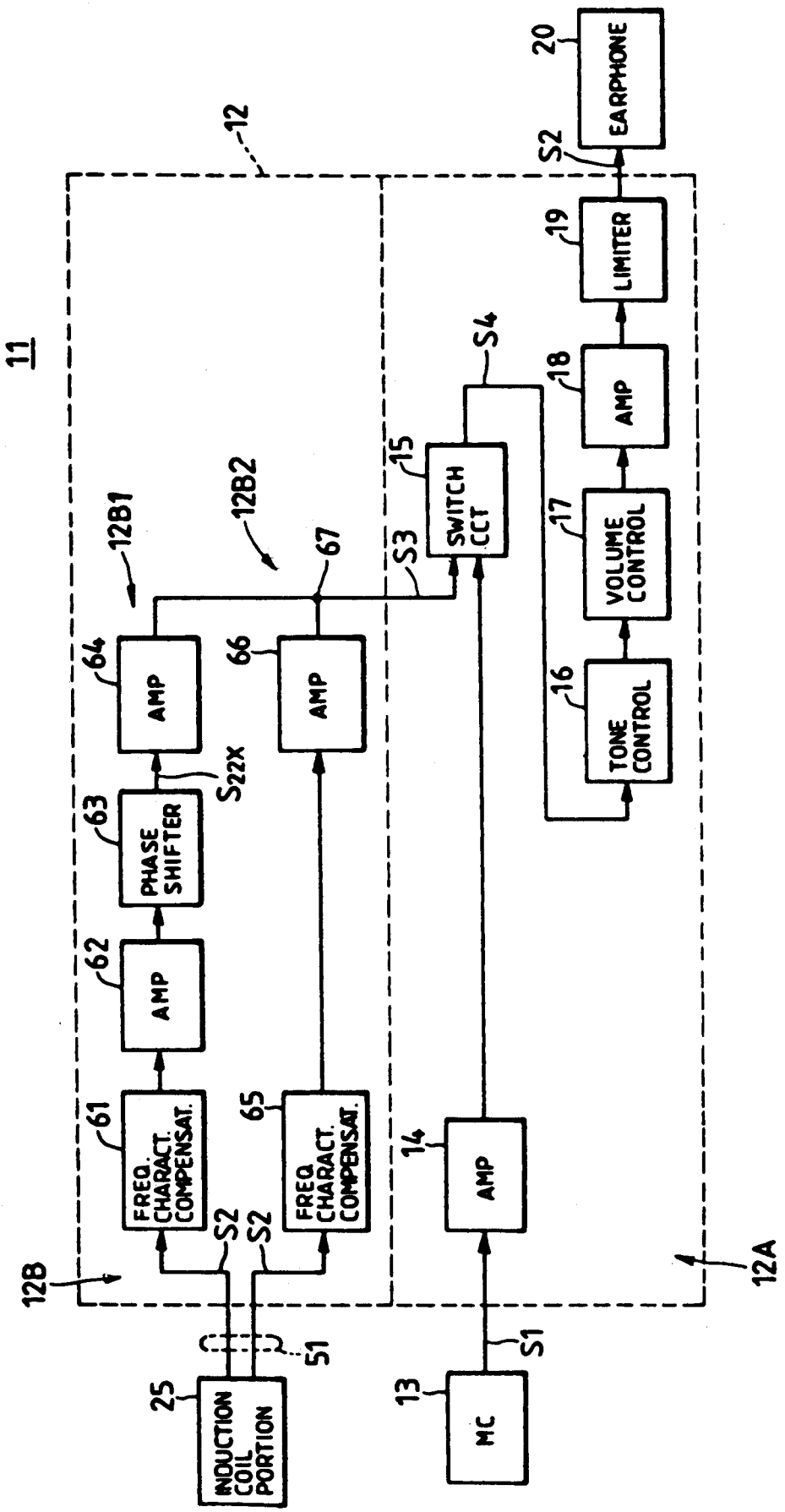
FIG. 1 is a block circuit diagram of an embodiment of the present invention.

In FIG. 1 which is a block circuit diagram of an embodiment of the present invention, a receiver 11 is composed of a signal processing circuit portion 12, a microphone 13, an ear-phone 20 and an induction coil portion 25. The signal processing portion 12 includes a hearing-aid circuit 12A and a sound signal detection circuit 12B. The microphone and the hearing-aid circuit 12A may have conventional constructions, respectively, except that the hearing-aid circuit 12A further includes a switch circuit 15. In this embodiment, the hearing-aid circuit 12A includes an amplifier 14 for amplifying a sound signal S1 from the microphone 13, the switch circuit 15, a tone control circuit 16, a volume control circuit 17, another amplifier 18 and an output limiter circuit 19 whose output S2 is connected to the conventional earphone 20. This circuit construction and its operation are well known and therefore details thereof are omitted in this specification.

The sound signal detection circuit 12B is composed of a first signal processing portion 12B1 and a second signal processing portion 12B2. The first signal processing portion 12B1 includes a frequency characteristics compensator 61 having an input connected through two of four lines of an electric conductor 51 to an output of the induction coil portion 25, an amplifier 62 for amplifying an output of the frequency characteristics compensator 61, a phase shifter 63 for shifting the phase of an output of the amplifier 62, and an amplifier 64 connected to an output of the phase shifter 63. The second signal processing portion 12B2 includes a frequency characteristics compensator 65 having an input connected to the induction coil portion 25 through the remaining two lines of the conductor 51 and an amplifier 66 for amplifying an output of the compensator 65. Outputs of the amplifiers 64 and 66 are connected together to another input of the switch circuit 15 of the hearing-aid portion 12A.

Figure 2:
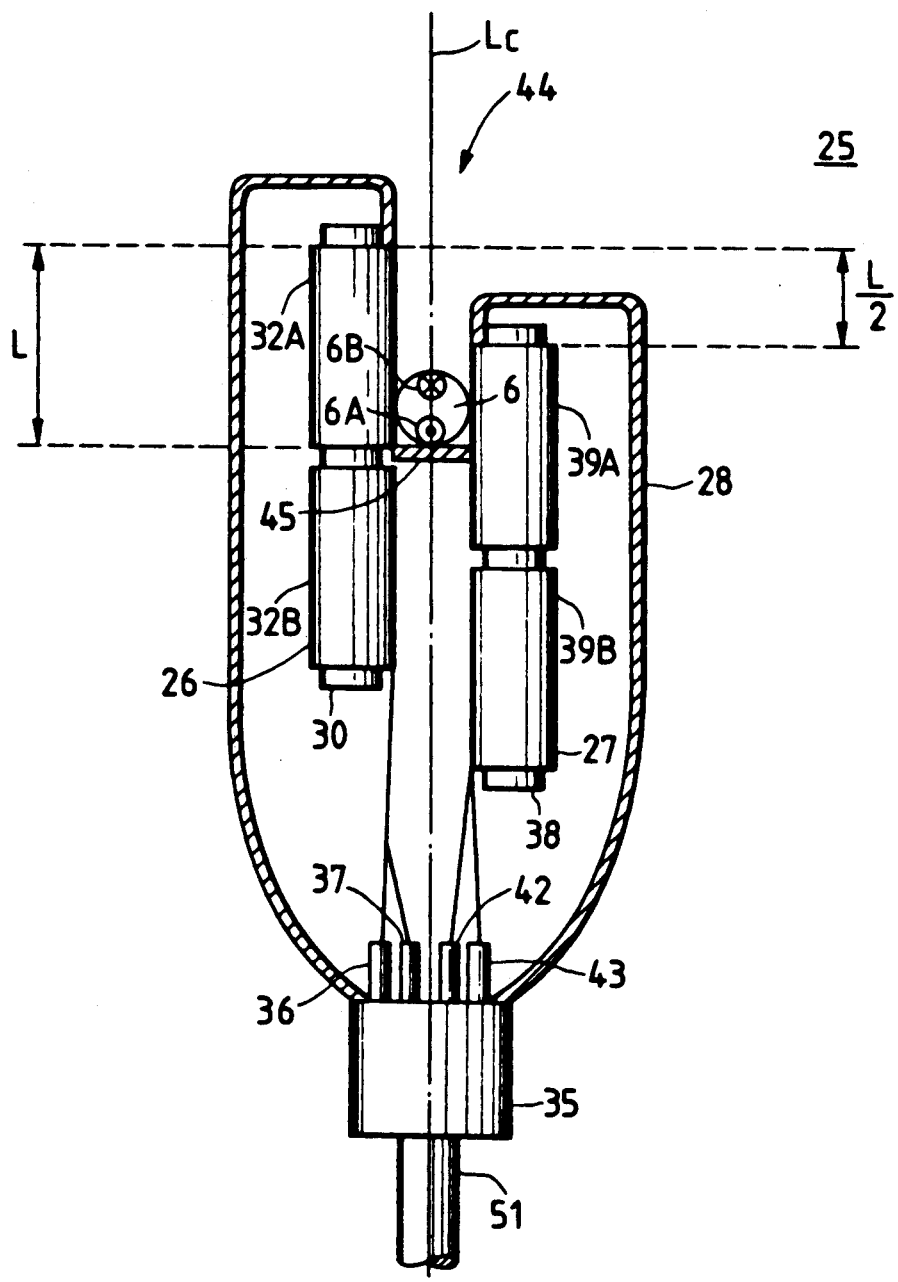
FIG. 2 is a partial cross section of an induction coil portion of the embodiment in FIG. 1.

FIG. 2 is a partial cross section of an embodiment of the induction coil portion 25 shown in FIG. 1. In FIG. 2, the magnetic induction coil portion 25 comprises a first magnetic induction coil portion 26 and a second induction coil portion 27 each of which includes a magnetic core in the form of rod and a pair of induction coils wound, in opposite directions, on respective halves thereof. The magnetic induction coil portions 26 and 27 are supported substantially in parallel to each other and symmetrically of a center line Lc with an axial deviation of a predetermined amount by a housing 28.

Figure 3:
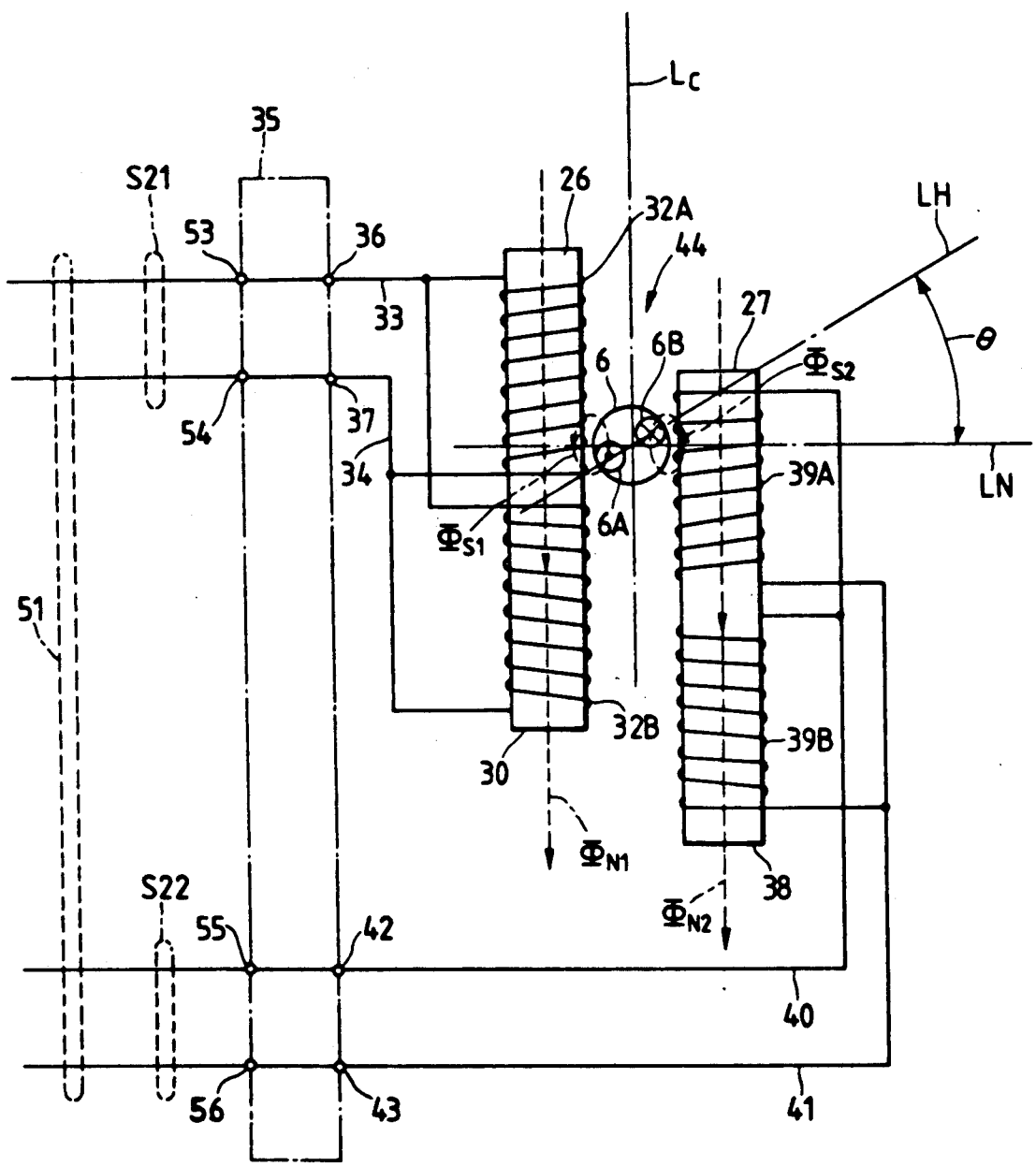
FIG. 3 is a basic circuit diagram of the magnetic induction coil means shown in FIG. 2.

FIG. 3 is a circuit diagram of the induction coil portion 25 shown in FIG. 2. In FIG. 3, the magnetic induction coil portion 26 includes the magnetic core 30 on halves of which the coils 32A and 32B are wound in opposite directions. The coils 32A and 32B are connected in parallel to each other and connected to internal connection terminals 36 and 37 through lead wires 33 and 34, respectively.

The magnetic induction coil potion 27 has the same construction as that of the magnetic coil portion 26 and includes the magnetic core 38 and coils 39A and 39B wound thereon which are connected in parallel to each other and to internal connection terminals 42 and 43 through lead wires 40 and 41, respectively.

The housing 28 takes in the form of a general U-shape with leg portions in which the magnetic induction coil portions 26 and 27 are housed, respectively, being different in length due to the axial deviation thereof. A valley 44 of the U-shaped housing 28 is bottomed with a stop wall 45 adapted to receive a telephone cord 6 so that the telephone cord 6 can be received thereby perpendicularly to the magnetic coils on the magnetic induction coil portions 26 and 27.

The axial mutual deviation of the magnetic induction coil portions 26 and 27 is set to a value L/2 where L is an axial length of one of the coils on each magnetic core, which may close to a half length of the magnetic core rod.

The internal connection terminals 36, 37, 42 and 43 are supported by a connector 35. An output signal S21 on the internal connection terminals 36 and 37 connected to the magnetic induction coil portion 26 is supplied to external terminals 53 and 54 which are connected to the first processing circuit portion 12B1 of the sound signal detection circuit 12B through the conductor 51.

An output signal S22 from the magnetic induction coil portion 27 and appearing on the internal connection terminals 42 and 43 of the connector 35 is sent through the external connection terminals 55 and 56 of the connector 35 and the conductor 51 to the second processing circuit portion 12B2 of the sound signal detection circuit portion 12B.

Returning to FIG. 1, the output signal S21 of the magnetic induction coil portion 26 supplied to the frequency characteristics correction circuit 61 is corrected in frequency and, after being amplified by the amplifier 62, is shifted in phase by the phase shifter 63.

The frequency characteristics correction circuit 61 functions to change the frequency characteristics of the sound output, signal S21 from the magnetic induction coil portion 26 correspondingly to a magnetic flux leakage from the telephone cord 6, which, otherwise, tends to result in uncomfortable metallic sound.

The phase shifter 63 functions to shift the phase of the signal S21 by a predetermined amount, for example, advance it by 90°, and a resultant phase-shifted output signal S21X is amplified by the amplifier 64.

The output signal S22 from the induction coil portion 27 is supplied to the frequency characteristics correction circuit 65 of the second processing circuit portion 12B2 and, after correction of frequency characteristics thereof, is amplified by the amplifier 66.

The phase-shifted output signal S21X from the first processing circuit portion 12B1 and the output signal from the second processing circuit portion 12B2 are combined at a point 67 and supplied to the switch circuit 15 as a sound pick-up signal S3.

In this embodiment, the switch circuit 15 is switchable between three states. In a first switch state, the switch circuit 15 selects the signal S1 and sends it to the tone control circuit 16 as a switch output signal S4. In a second switch state, it combines the signal S1 and the pick-up signal S3 and sends a resultant signal as the switch output signal S4. In a third switch state, it selects the pick-up signal S3 and sends the latter as the switch output signal S4.

Since the magnetic induction coil portions 26 and 27 are axially deviated by L/2, it is possible to form the sound pick-up signal S3 stably with a practically sufficiently high level from the output signals S21 and S22 of the portions 26 and 27 regardless of the position of the telephone cord 6 received in the valley 44 and regardless of the twist angle of the core lines 6A and 6B of the cord 6, which is represented by an angle of a line Lh connecting the centers of the core lines 6A and 6B with respect to a line Ln normal to the center line Lc.

Figure 4:
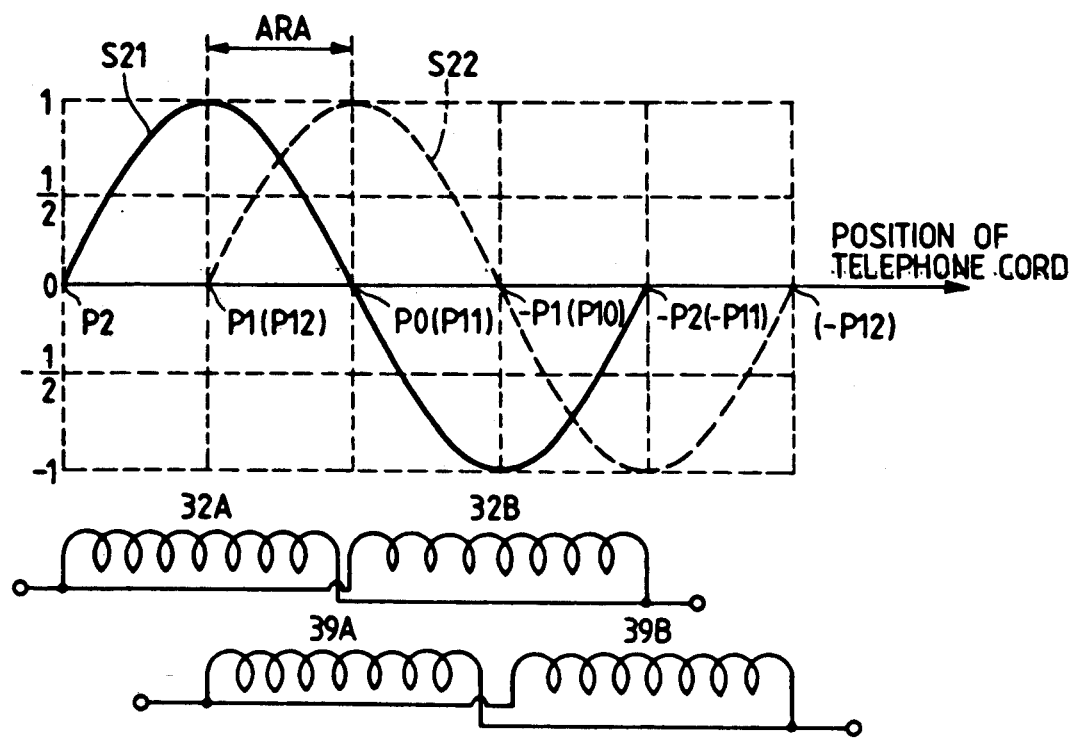
FIG. 4 shows plots of measured composite output level of the magnetic induction coil means with respect to a relative position of the telephone cord to the induction coil means.

That is, as shown in FIG. 4 which shows plots of the output level of the induction coil portions with respect to the position of the telephone cord in between the induction coils, it has been found that a signal level of the output signal S21 decreases through null at an intermediate position P0 between the coils 32A and 32B when the telephone cord 6 is moved in parallel to the magnetic induction coil portion 26 toward a position −P1 along the center line Lc while keeping the line LH coincident on the line Ln, i.e., θ=0, the null output being due to the fact that magnetic flux leakage from the telephone cord 6 couples to the coils 32A and 32B substantially equally, which are wound in opposite directions.

It has been also found that, when the telephone cord 6 moves in an opposite direction from the position P0 which may be a center position of the coils 32A, 32B toward a position P1 by a distance corresponding to L/2, the coupling of flux leakage to the induction coil portion 26 increases and thus the output signal level of the signal S21 increases correspondingly. At the position P1, the signal level of the signal S21 became maximum.

When the telephone cord 6 was further moved toward a top position P2 of the coil 32A, the magnetic coupling of the coil 32A decreased gradually and therefore the level of the output signal S21 also decreased. At the position P2, the output signal level became null.

When the telephone cord 6 was moved from the intermediate position P0 through an intermediate position −P1 to a top position −P2 of the coil 32B the direction of which is opposite to that of the coil 32A, the level of the output signal S21 decreased from null to the negative peak and then increased to null as shown by the solid line in FIG. 4.

The level of the output signal S22 of the coils 39A and 39B of the induction coil portion 27 with a movement of the telephone cord 6 from an intermediate position P10 through the center position P11 to the position P12 of the coil 39A increased through a positive peak and then returned to null. With an opposite movement through the position −P11 to the −P12 in the direction of the coil portion 39B, the level changed through the negative peak to null.

Since the induction coil portions 26 and 27 are deviated in position by L/2, points at which the signal S21 becomes 0 level, a point at which it becomes positive peak and a point at which it becomes negative peak, i.e., P2, P1, P0, −P1 and −P2, are deviated by L/2 from corresponding points for the ouput signal S22, i.e., P12, P11, P10, −P11 and −P12, respectively.

It has been found that the plots in FIG. 4 show the output level variations of the signals S21 and S22 which may be approximated by sinusoidal waveforms, respectively, with a phase difference of about 90°.

In this embodiment, the depth of valley 44 is determined such that the telephone cord 6 can move within a range ARA (FIG. 4) corresponding to a distance and position between positions P0 and P1 of the induction coil portion 26 which correspond to positions P11 and P12 of the induction coil portion 27, respectively.

Figure 5:
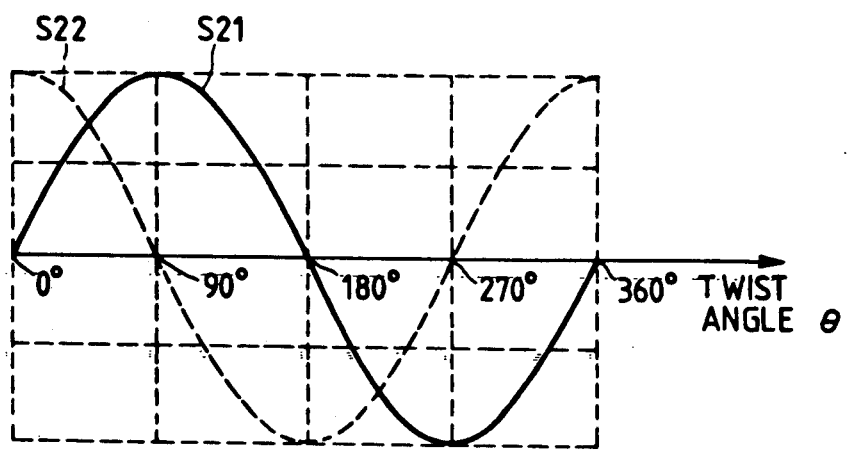

FIG. 5 shows a relation between the output signals S21 and S22 and the twist angle $\theta$ of the line Lh connecting the centers of the conductor cores 6A and 6B of the telephone cord 6 with respect to the line Ln which is orthogonal to the center line Lc, within the range ARA. It has been found that the output levels of the signals S21 and S22 from the induction coil portions 26 and 27 change substantially sinusoidally with a change of the twisting angle $\theta$ from 0° to 360°. That is, when the twisting angle $\theta$ is changed from 0° to 360° while the telephone cord 6 is positioned at the position P0 in FIG. 4, the output signal S21 from the induction coil portion 26 may be approximated by the following equation:

$$S21 = M \sin\alpha \sin\theta \quad (1)$$

where $\sin \alpha$ represents a signal component of a sound current. As is clear from the above equation, an amplitude component $M \sin \theta$ of the output signal changes sinusoidally from 0 level at the position P0 in FIG. 4 with $\theta = 0°$.

Similarly, the signal S22 from the induction coil portion 27 may be approximated by the following equation:

$$S22 = M \sin\alpha \cos\theta \quad (2)$$

Thus, it is clear that an amplitude component $M \cos \theta$ of the signal S22 changes sinusoidally from maximum at the position P11 in FIG. 4 with $\theta = 0°$, with a phase difference of 90° with respect to the signal S21.

The output signal S22 represented by the equation (2) is phase-shifted by the phase shifter 63 of the first processing circuit portion 12B1 by 90° as mentioned previously. Therefore, a resultant signal S21X can be represented by the following equation:

$$S21X = M \cos\alpha \cos\theta \quad (3)$$

Thus, the sound current component is converted from $\sin \alpha$ into $\cos \alpha$. As a result, the sound pick-up signal S3 obtained at the point 67 in FIG. 1 can be represented as a sum of the output signal S21 represented by the equation (1) and the phase-shifted output signal S21X represented by the equation (3), which can be represented by the following equation:

$$\begin{aligned} S3 &= S21 + S22 \\ &= M \sin\alpha \sin\theta + M \cos\alpha \cos\theta \\ &= M \cos(\alpha - \theta) \end{aligned} \quad (4)$$

Thus, it is possible to convert the signal S3 into a sinusoidal signal $\cos(\alpha - \theta)$ having an amplitude M which is constant regardless of the twist angle of the telephone cord 6.

In operation, the magnetic induction coil means 25 is adapted to be coupled to a telephone receiver set after a hook switch thereof is turned on, in such a way that the telephone cord 6 thereof is received in the valley 44 of the magnetic induction coil means 25. The output signals S21 and S22 produced by the magnetic coupling of the induction coil portions 26 and 27 to sound current flowing through the core conductors 6A and 6B of the telephone cord 6 through magnetic flux leakage therefrom are supplied to the frequency characteristics correction circuits 61 and 65 of the first and the second processing circuit portions 12B1 and 12B2 of the sound signal detection circuit 12B and amplified by the amplifiers 62 and 66 thereof, respectively.

Since the signal levels of these signals S21 and S22 are determined according to the position of the telephone cord 6 in the valley 44 as mentioned previously with reference to FIG. 4, it is not always possible to obtain the maximum signal levels. However, by regulating the twist angle $\theta$ of the telephone cord 6 within the valley 44 according to the relation mentioned with reference to FIG. 5, it is possible to obtain the maximum signal levels. The regulation of the twist angle may be performed by changing an applying direction of the magnetic induction coil means 25 onto the telephone cord 6.

The output of the amplifier 62 of the first processing circuit portion 12B1 is phase-shifted by 90° by the phase shifter 63 to provide the signal S21X which, after being amplified by the amplifier 64, is added to the output of the amplifier 66 at the point 67 to provide the composite pickup signal S3 whose signal level is automatically kept substantially constant practically regardless of change in the twist angle $\theta$ of the telephone cord 6 with respect to the magnetic induction coil means 25.

The construction of the oppositely wound induction coils of each of the magnetic induction coil portions 26 and 27 is effective in blocking external noise in the form of magnetic flux. That is, magnetic flux such as shown by $\Phi_{n1}$ and $\Phi_{n2}$ in FIG. 3 may constitute external noise. In the present invention, however, these fluxes pass through the opposite coils 32A and 32B and the opposite coils 39A and 39B, respectively. Therefore, voltages induced in each coil pair are opposite in polarlity and cancel out each other. Thus, they have no effect on the output signals therefrom.

On the other hand, magnetic flux $\Phi_{s1}$ and $\Phi_{s2}$ produced by currents flowing through the core conductors 6A and 6B of the telephone cord 6 couple to only portions of the induction coil portions 26 and 27, in FIG. 3, portions of the coils 32A and 39A, respectively. Therefore, they are not cancelled out each other and can be derived as the output signals S21 and S22.

Although the present invention has been described mainly as being applied to the hearing-aid, the present invention is not limited thereto. It should be noted that the present invention can be applied to any audio receiver.

Further, it is possible to apply this invention to other electric wires than the telephone cord so long as they carry sound current.

It should be noted further that the amount of phase shift to be introduced in the output signal S21 by the phase-shifter 63 of the first processing circuit portion 12B1 in FIG. 1 is not limited to 90° and may be changed within a range, for example, 90°±45°, so long as the amplitude of the signal S3 can be maintained practically constant.

Further, the amount of relative axial deviation of the magnetic induction coil portions is not limited to L/2. In FIG. 4, for example, it may be changed to values corresponding to ±45° in phase difference between the signals S21 and S22.

It may be possible to support the magnetic induction coil portions 26 and 27 rotatably about a position around the stop wall 45 of the valley 44, respectively. When it is desired to put the electric wire 6 in the valley 44, the portions 26 and 27 are rotated outwardly to open the valley 44 and, after the wire 6 is put therein, the portions 26 and 27 are rotated inwardly to pinch the wire therebeteween.

It should be noted that, although the induction coil portions 26 and 27 are identical and arranged with a relative positional deviation, they may be not always identical so long as the regions thereof on which the induction coils are wound are relatively deviated in position by a predetermined amount substantially.

Further, it should be noted that the output signal which is subjected to phase-shift can be either of the output signals obtained from the induction coil portions.

The output signal S2 in FIG. 1 can be applied to any other audio device than the earphone.

Figure 6:
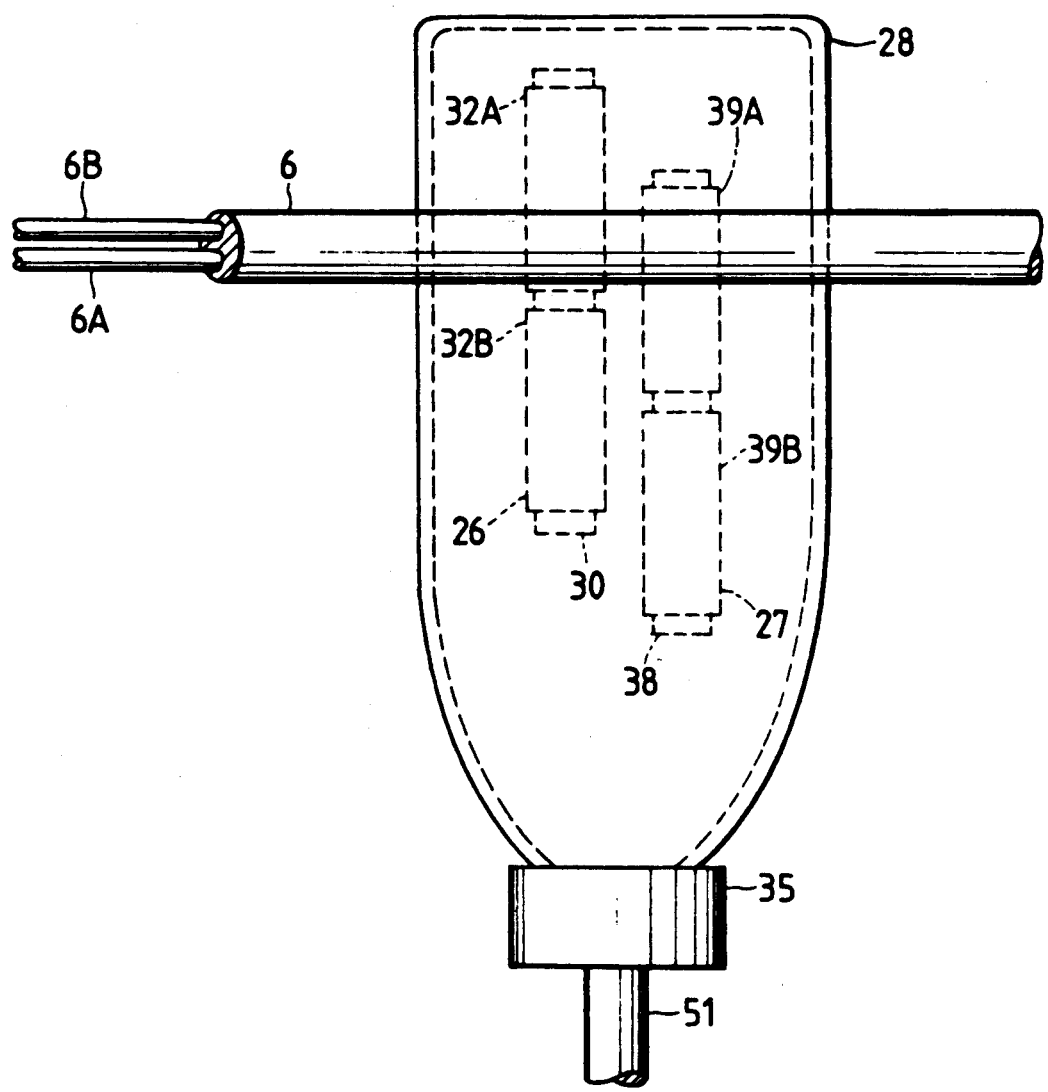
FIG. 6 shows plots of measured output level of the induction coil means with respect to a twisting angle of the telephone cord positioned at a certain position in between the induction coil means.
Figure 7:
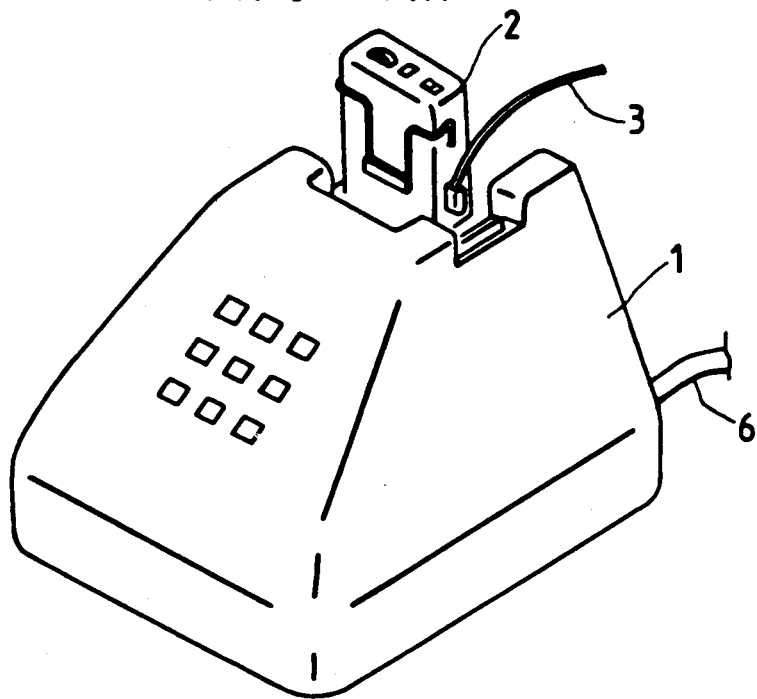
FIG. 7 is a perspective view of a conventional hearing-aid means.
Figure 8:
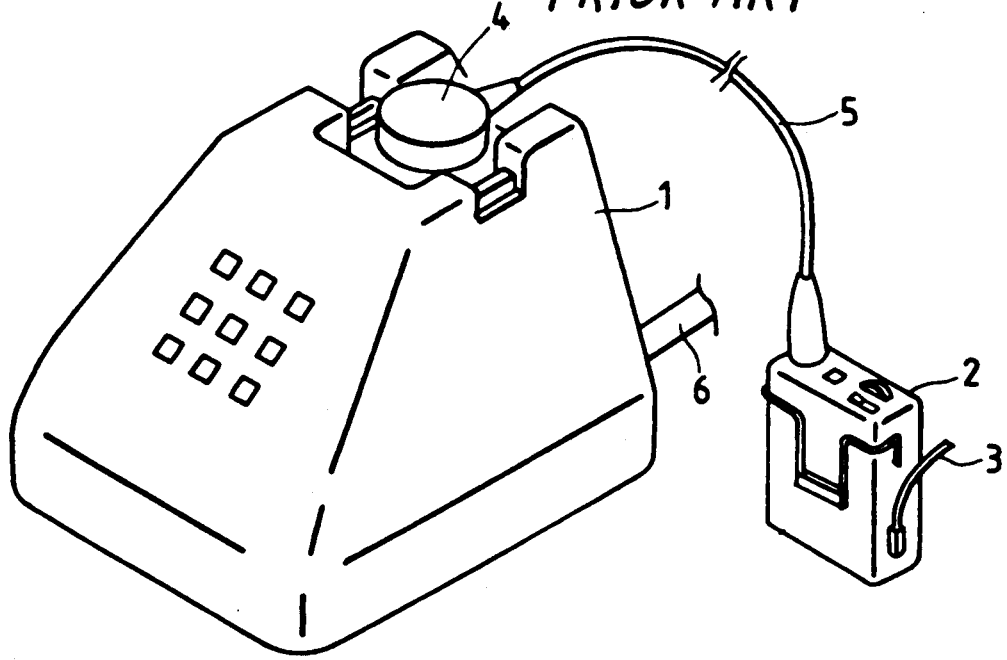
FIG. 8 is a perspective view of another conventional hearing-aid means.

In addition, the telephone cord 6 may be associated with the induction coil portions 26 and 27 in such a way as shown in FIG. 6. In FIG. 6, a telephone cord 6 is arranged outside a housing of the magnetic induction coil means orthogonally of the induction coil portions 26 and 27.

As described hereinbefore, according to the present invention, it becomes possible to pick up sound effectively from sound current flowing through the electric wire without external noise, regardless of twisting of the wire.

What is claimed is:

1. An audio current pick-up device comprising a first magnetic induction coil means including at least one induction coil, a second magnetic induction coil means including at least one induction coil, said first and said second magnetic induction coil means being arranged in parallel to each other with an axial positional deviation of said induction coil of said first magnetic induction coil means with respect to that of said second magnetic induction coil means by a predetermined amount, and circuit means for combining output signals of said first and said second magnetic induction coil means to form a sound output signal, wherein said first and said second magnetic induction coil means include magnetic rod cores, respectively, and wherein a pair of coils are wound in opposite directions on respective halves of each of said magnetic rod cores, said pair of coils being connected in parallel to each other, and said output signals being derived from said coil pairs.

2. An audio current pick-up device according to claim 1, further comprising means for phase-shifting one of said output signals by a predetermined amount, and means for combining said phase-shifted output signal with the other output signal to form a sound pick-up signal, and wherein said sound output signal is produced on the basis of said sound pick-up signal.

3. The device as claimed in claims 1 or 2, further comprising an earphone having an input connected to an output of said circuit means.

* * * * *